UNITED STATES PATENT OFFICE.

VICTOR DE KARAVODINE, OF PARIS, FRANCE.

PROCESS OF MANUFACTURING INSULATING MATERIAL.

SPECIFICATION forming part of Letters Patent No. 724,882, dated April 7, 1903.

Application filed March 26, 1902. Serial No. 100,101. (No specimens.)

*To all whom it may concern:*

Be it known that I, VICTOR DE KARAVODINE, a subject of the Emperor of Russia, and a resident of Paris, France, have invented a certain new and Improved Process of Manufacturing Insulating Material, of which the following is a specification.

This process has for its object the production of insulating material with a base of resinous substances or drying-oils, which shall possess great resistance to high temperatures of 150° to 200° and retain its solid condition. It is known that bitumen, for example, when mixed with sulfur and subjected to a certain temperature in the manner adopted for vulcanizing rubber produces vulcanized bitumen. This product is, however, liable to become soft even at slightly elevated temperatures. I have discovered that this objection may be obviated by heating to a much higher temperature than that ordinarily required for vulcanizing rubber or bitumen almost any of the resins and drying-oils mixed with a certain quantity of sulfur, and by reason of the elevated temperature the said materials enter into such a combination with the sulfur as to remain solid at temperatures varying between 150° and 250° centigrade. This fact is intensified by an addition to the aforesaid substances of certain inert bodies either in a fibrous or pulverulent state, such as asbestos, sand, pumice-stone, &c.

In carrying the invention into effect I mix powdered resin—such as bitumen, gum-lake, coal-tar, or similar substances—*i. e.*, such as will not readily decompose at temperatures from 250° to 300° centigrade—with about fifteen to forty per cent. of powdered sulfur. To this mixture is then added by malaxing either cold, or preferably hot, thirty to seventy per cent. of asbestos, sand, or pumice-stone. The same proportions are also suitable when oils are used in lieu of resins. The mixture thus prepared is heated in a metallic vessel provided with a cover loaded with a certain weight to prevent the contents of the vessel during fusion from boiling over by reason of the envolving gas in the interior. During the operation it is advantageous to stir the boiling mass so as to facilitate the mixing operation. At the temperature of about 350° to 400° centigrade the mixture yields thick vapors, which, however, gradually diminish after a period of from fifteen minutes to two or three hours of heating, according to the nature of the resins or oils employed, while the mixture hardens and gradually passes from a pasty condition to an almost solid state. This material is then compressed in the required quantities in appropriate molds heated to a temperature of from 250° to 400° centigrade and under pressures varying between one hundred and three hundred kilograms per cubic centimeter, in accordance with the article required to produce. If it is required to produce a very homogeneous product with higher acid-resisting qualities, it will be necessary to allow the material to cool before compressing the same, and then grind it before placing it in the heated molds. The molds may be heated either before or during compression, according to particular requirements. The more sulfur the mixture contains the more quickly will it harden. A mixture with fifteen per cent. of sulfur softens at about 150° centigrade, and with less sulfur it will soften even at a lower temperature. Mixtures containing large quantities of sulfur—say twenty per cent. and more—when heated too long before being compressed harden to such an extent that at the subsequent compression the particles of the material will not so readily adhere together, and thereby impair the mechanical resistance of the same. With a little experience, however, it is easy to find the most suitable degree of solidification which it is necessary to attain before the compression.

By heating resins or drying-oils to temperatures of from 300° to 350° centigrade they yield a portion of their volatile constituents. I have found that when using resins or oils thus prepared a more rapid vulcanization is attained, while the product is of better quality.

Having now fully described my invention, what I claim, and desire to secure by Letters Patent, is—

The herein-described process for producing insulating material which consists in mixing resins or oils with powdered sulfur and non-active material, closely confining the mixture and subjecting the same to a temperature of 350° to 400° centigrade, agitating the substance during heating, then cooling the material, grinding the material after it is cooled, and compressing the material at a temperature of from 250° to 400° centigrade and under pressure of from one hundred to three hundred kilograms per cubic centimeter.

In testimony whereof I have hereunto set my hand in presence of two witnesses.

VICTOR DE KARAVODINE.

Witnesses:
ADOLPHE STURM,
EDWARD P. MACLEAN.